Dec. 22, 1931.  J. N. GOOD  1,837,429
ELECTROPNEUMATIC BRAKE
Filed March 22, 1930
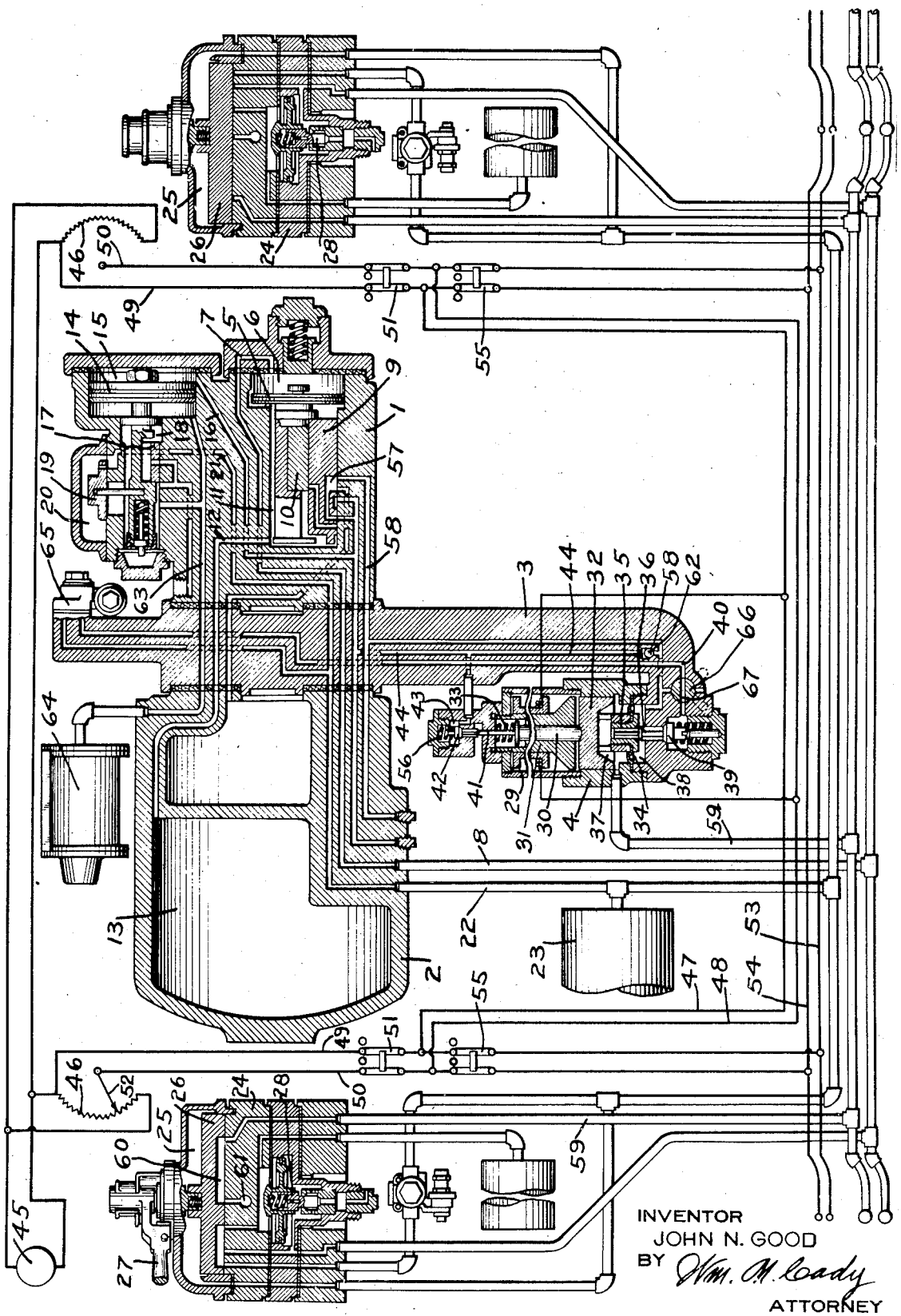
INVENTOR
JOHN N. GOOD
BY
Wm. M. Cady
ATTORNEY Patented Dec. 22, 1931

1,837,429

UNITED STATES PATENT OFFICE

JOHN N. GOOD, OF WILMERDING, PENNSYLVANIA, ASSIGNOR TO THE WESTINGHOUSE AIR BRAKE COMPANY, OF WILMERDING, PENNSYLVANIA, A CORPORATION OF PENNSYLVANIA

ELECTROPNEUMATIC BRAKE

Application filed March 22, 1930. Serial No. 438,003.

This invention relates to electro-pneumatic brakes, and more particularly to an electro-pneumatic brake equipment for an electric locomotive.

The principal object of my invention is to provide a combined automatic fluid pressure brake equipment and an electro-pneumatic brake apparatus for independently controlling the application and release of the brakes.

Other objects and advantages will appear in the following more detailed description of the invention.

In the accompanying drawing, the single figure is a diagrammatic sectional view of a combined fluid pressure and electro-pneumatic brake apparatus for a locomotive, embodying my invention.

The apparatus may comprise a distributing valve device of the well known E. T. locomotive brake equipment, and having a valve casing 1 and a reservoir casing 2. According to my invention, a filling piece 3 is interposed between the casings 1 and 2, with which is associated an electro-pneumatic controlling valve device 4.

The distributing valve device comprises an equalizing portion and an application and release portion. The equalizing portion comprises a piston 5 contained in piston chamber 6, which chamber is connected through passage 7 with the usual brake pipe 8. Piston 5 is adapted to operate a main valve 9 and a graduating valve 10, contained in valve chamber 11, which chamber is connected through passage 12 with the usual pressure chamber 13.

The application and release portion comprises a piston 14 contained in application cylinder 15, which cylinder is connected to a passage 16, leading to the seat of slide valve 9. The piston 14 is adapted to operate a release valve 17, contained in valve chamber 18, and a supply valve 19, contained in valve chamber 20, which chamber is connected, through passage 21 and pipe 22, with the usual main reservoir 23.

An engineer's brake valve 24 is provided at each end of the locomotive, and comprises a casing having a valve chamber 25 containing a rotary valve 26 adapted to be operated by a handle 27. Contained in the brake valve device is the usual equalizing discharge valve mechanism 28, for controlling the venting of fluid under pressure from the brake pipe in effecting a service application of the brakes.

The electro-pneumatic device 4 comprises an electro-magnet 29, having a rod 30 extending through a bore in its core 31, and engaging at one end an armature 32 and subject on its opposite end to the pressure of a spring 33. Movable with armature 32 is a flexible diaphragm 34, having a center piece 35 which is provided with a seat for a valve 36, which controls communication from chamber 37 at one side of the diaphragm to chamber 38 at the opposite side. A valve 39 connected to valve 36 by a stem controls communication from a fluid pressure supply passage 40 to chamber 38.

The rod 30 has an upwardly extending stem 41 adapted to engage the stem of a release valve 42 contained in chamber 43, which chamber is connected by passage 44 to the application cylinder passage 16.

Current for energizing the magnet 29 is supplied from a generator 45, across the terminals of which is connected a rheostat resistance coil 46 at each end of the vehicle. Wires 47 and 48, leading from the terminals of the magnet 29 are connected to wires 49 and 50, a double throw switch 51 being disposed in the wires 49 and 50 to control the opening and closing of the magnet circuit. The wire 49 is connected at one end of the resistance coil 46, and a movable contact arm 52 is connected to the wire 50, the arm 52 being movable to vary the amount of the resistance coil 46 which is cut into the magnet circuit. The wires 49 and 50 are connected to train wires 53 and 54, which are adapted to be connected to the corresponding train wires of another vehicle, when desired. A double throw switch 55 is placed in the wires leading to the train wires 53 and 54, so that the circuit on the vehicle may be connected to or disconnected from the train wires when desired.

With the circuit arrangement above described, the magnet 29 is always energized, so long as the generator 45 or source of current is supplying current, but the voltage impressed on the magnet varies according to the position of the arm 52 and the amount of resistance cut into the magnet circuit. At a position of the contact arm, which is termed the running position, such as the position shown in the drawing, the amount of resistance cut into the magnet circuit is such that while the magnet coil 29 is energized sufficiently so that the pull of the magnet coil on the armature 32 will slightly compress the spring 33 but will not be sufficient to overcome the additional opposing force of the spring 56 acting on the valve 42. The result is that in this position, the stem 41 engages the stem of valve 42, but the valve 42 is not lifted from its seat.

In the running position, the diaphragm 34 is maintained in a position by the armature 32, such that the valve 36 is unseated, as shown in the drawing.

In the release position of the equalizing piston 5, a cavity 57 in the main slide valve 9 connects application cylinder passage 16 with a passage 58, leading to chamber 38 and consequently the application cylinder is connected to the distributing valve release pipe 59 when the valve 36 is unseated. With the brake valve handle 27 in running position, a cavity 60 in the rotary valve 26 connects the distributing valve release pipe 59 with an atmosphere exhaust port 61.

If it is desired to effect an electro-pneumatic application of the brakes on the locomotive, the contact arm 52 is moved in a clockwise direction from the running position, shown at the left of the drawing, so that the amount of the resistance coil 46 in the magnet coil circuit is increased, and consequently the voltage impressed on the magnet coil 29 is reduced. The armature 32 is then moved away from the magnet coil by the pressure of spring 33, causing the diaphragm 34 to be moved downwardly. The valve 36 is first seated by this movement and then the valve 39 is unseated.

Fluid under pressure is then supplied from passage 40, which is supplied with fluid at a reduced pressure from a reducing valve device 65, to chamber 38, and thence flows through passage 44 past check valve 62, to passage 16 and to the application cylinder 15. The piston 14 is then operated by the fluid pressure in chamber 15 to shift the release valve 17 so as to cut off communication from chamber 18 to the atmosphere, and to shift the valve 19, so as to open communication from the valve chamber 20 to chamber 18. Chamber 18 is connected, through passage 63 with the brake cylinder 64, so that fluid under pressure is supplied from valve chamber 18 to the brake cylinder.

When the pressure of fluid in chamber 38 has been increased to a degree such that the pressure of fluid acting on the diaphragm 34, plus the pull of the coil 29 on the armature 32, exceeds the opposing pressure of spring 33, the diaphragm will move upwardly, allowing the upper movement of the valves 36 and 39, until the valve 39 seats and cuts off the further supply of fluid to the chamber 38.

The pressure of fluid in the application cylinder 15 is thus determined by the operation of the magnet valve device 4, and when the pressure of fluid in chamber 18 and in the brake cylinder 64 has been increased to a degree slightly exceeding the pressure of fluid in application cylinder 15, the piston 14 will be shifted to the right, moving the valve 19, so as to cut off the further supply of fluid to the brake cylinder.

The brake cylinder pressure may be further increased by further movement of the contact arm 52 in a clockwise direction, so as to further increase the resistance in the circuit of the magnet coil 29 and thus cause a further reduction in voltage impressed on the magnet coil, the operation, as above described, being repeated.

In order to independently release the brakes on the locomotive, the contact arm 52 is moved in a counter-clockwise direction from running position, so that the resistance in the circuit of the magnet coil 29 is reduced and the voltage is increased, so that the pull of the magnet on the armature 32 will be sufficient to overcome the opposing pressure of the spring 56 as well as the spring 33. The stem 41 will then be moved upwardly by the armature 32 so as to unseat the valve 42, and permit the exhaust of fluid from passage 44 to the atmosphere. Fluid is then vented from the application cylinder 15 through passage 16, so that the brake cylinder pressure in chamber 18 acts to shift the piston 14 from lap position to release position, as shown in the drawing, in which the release valve 17 establishes communication from chamber 18 and the brake cylinder 64 to the atmosphere.

In double heading, the switch 51 at the operating end of the second locomotive is placed in open position, while the switch 55 remains in closed position, so that current is supplied through the train wires 53 and 54 from the head locomotive to the magnet device 4 on the second locomotive, so that the brakes may be electro-pneumatically controlled on both locomotives by manipulating the contact arm 52 on the head locomotive.

If it is desired to release the brakes on the second locomotive independently of the head locomotive, the switch 51 is closed and the switch 55 is opened. The contact arm 52 on the second locomotive may then be operated to effect the release of the brakes on the second locomotive without interfering with the control of the brakes on the head locomotive.

On a dead engine, the main reservoir 23 is charged with fluid under pressure from the brake pipe, through the usual dead engine fixtures (not shown), so that the reducing valve device 65 operates to supply fluid under pressure to passage 40. Since the magnet valve device 4 is deenergized on a dead locomotive, the valve 39 will be held open. In order to prevent the supply of fluid from passage 40 to chamber 38 on a dead locomotive, a cut-out cock 66 is provided, having a port 67 which establishes communication from passage 40 to the valve chamber containing the valve 39 in one position of the cock. When the locomotive is run as a dead engine, the cock 66 is turned so as to cut off communication from passage 40, and in this position, the port 67 connects passage 58 with the atmosphere, so that fluid under pressure may be released from passage 58 and from the application cylinder 15 when the equalizing piston 5 moves to release position in releasing the brakes after the brakes have been automatically applied on the dead engine by the usual operation of the distributing valve device.

The check valve 62 prevents fluid from the application cylinder 15 from escaping to the atmosphere by way of passage 44 and port 67 in the cock 66, when the brakes have been applied on the dead engine.

While one illustrative embodiment of the invention has been described in detail, it is not may intention to limit its scope to that embodiment or otherwise than by the terms of the appended claims.

Having now described my invention, what I claim as new and desire to secure by Letters Patent, is:

1. In an electro-pneumatic brake, the combination with a brake cylinder, a distributing valve device having valve means for controlling the supply and exhaust of fluid under pressure to and from the brake cylinder, a piston operated by variations in pressure in an application cylinder for operating said valve means, of a brake valve device, a valve for controlling communication from said application cylinder to said brake valve device, valves for controlling the admission and release of fluid under pressure to and from said application cylinder, and a single electro-magnet for controlling said valves.

2. In an electro-pneumatic brake, the combination with a brake cylinder, a distributing valve device having valve means for controlling the supply and exhaust of fluid under pressure to and from the brake cylinder, a piston operated by variations in pressure in an application cylinder for operating said valve means, of a brake valve device, a valve for controlling communication from said application cylinder to said brake valve device, a valve for controlling the supply of fluid to said application cylinder, a valve for controlling the release of fluid from said cylinder, and an electro-magnet device for opening one valve when the voltage impressed on the magnet is reduced, for opening another valve when the voltage is increased, and for opening the third valve when the voltage is further increased.

3. In an electro-pneumatic brake, the combination with a brake cylinder, a distributing valve device having valve means for controlling the supply and exhaust of fluid under pressure to and from the brake cylinder, a piston operated by variations in pressure in an application cylinder for operating said valve means, of a brake valve device having a position for releasing fluid from said application cylinder, a valve for controlling communication from said application cylinder to the brake valve device, an electro-magnet for operating said valve, and a valve operated by said electro-magnet for controlling the supply of fluid under pressure to said application cylinder.

In testimony whereof I have hereunto set my hand, this 20th day of March, 1930.

JOHN N. GOOD.